US010481270B2

(12) United States Patent
Maisonnier et al.

(10) Patent No.: US 10,481,270 B2
(45) Date of Patent: Nov. 19, 2019

(54) DEVICE FOR DETECTING AN OBSTACLE BY MEANS OF INTERSECTING PLANES AND DETECTION METHOD USING SUCH A DEVICE

(71) Applicant: SOFTBANK ROBOTICS EUROPE, Paris (FR)

(72) Inventors: Bruno Maisonnier, Paris (FR); Jörg Ziegler, Paris (FR); Vincent Clerc, Clamart (FR); Nicolas Garcia, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 351 days.

(21) Appl. No.: 15/310,717

(22) PCT Filed: Jun. 5, 2015

(86) PCT No.: PCT/EP2015/062622
§ 371 (c)(1),
(2) Date: Nov. 11, 2016

(87) PCT Pub. No.: WO2015/185749
PCT Pub. Date: Dec. 10, 2015

(65) Prior Publication Data
US 2017/0074984 A1 Mar. 16, 2017

(30) Foreign Application Priority Data
Jun. 5, 2014 (FR) ...................................... 14 55098

(51) Int. Cl.
*G01S 17/00* (2006.01)
*G01S 17/93* (2006.01)
(Continued)

(52) U.S. Cl.
CPC .......... *G01S 17/936* (2013.01); *G01S 17/023* (2013.01); *G01S 17/46* (2013.01); *G05D 1/0248* (2013.01); *G05D 2201/0217* (2013.01)

(58) Field of Classification Search
CPC ........................ G01D 1/0242; G05D 1/0246
See application file for complete search history.

(56) References Cited

U.S. PATENT DOCUMENTS 5,040,116 A     8/1991   Evans et al.
2001/0055063 A1* 12/2001  Nagai ..................... G01S 5/16
                                                    348/116

(Continued)

FOREIGN PATENT DOCUMENTS

DE   10 2008 014912 A1   9/2009
JP       2008-039745 A    2/2008

(Continued)

*Primary Examiner* — Hovhannes Baghdasaryan
(74) *Attorney, Agent, or Firm* — Baker & Hostetler LLP

(57) ABSTRACT

An obstacle detection device to be fitted to a mobile vehicle able to move parallel to a reference plane comprises: at least two emitters of electromagnetic beams which are able to form two virtual planes in two different directions that are able to intersect one another and intersect a potential obstacle, at least one image sensor able to produce an image of the intersection of the virtual planes and of the potential obstacle, an image analysis means able to determine the presence of an obstacle, configured to compare the image with a reference image. A detection method employing such a device is also provided.

16 Claims, 14 Drawing Sheets

(51) Int. Cl.
*G01S 17/46* (2006.01)
*G05D 1/02* (2006.01)
*G01S 17/02* (2006.01)

(56) References Cited

U.S. PATENT DOCUMENTS

| | | |
|---|---|---|
| 2002/0091466 A1 | 7/2002 | Song et al. |
| 2004/0066500 A1 | 4/2004 | Gokturk et al. |
| 2004/0088079 A1 | 5/2004 | Lavarec et al. |
| 2005/0195383 A1* | 9/2005 | Breed .................. B60N 2/002 356/4.01 |
| 2006/0182365 A1 | 8/2006 | Park et al. |
| 2007/0135966 A1 | 6/2007 | Kawaguchi et al. |
| 2009/0125175 A1 | 5/2009 | Park et al. |
| 2013/0204483 A1 | 8/2013 | Sung et al. |
| 2013/0226344 A1 | 8/2013 | Wong et al. |
| 2014/0129027 A1 | 5/2014 | Schnittman |

FOREIGN PATENT DOCUMENTS

| | | |
|---|---|---|
| KR | 10-2008-0093768 A | 10/2008 |
| RU | 2 254 227 C1 | 6/2005 |
| RU | 2 262 878 C2 | 10/2005 |
| RU | 139 571 U1 | 4/2014 |

\* cited by examiner

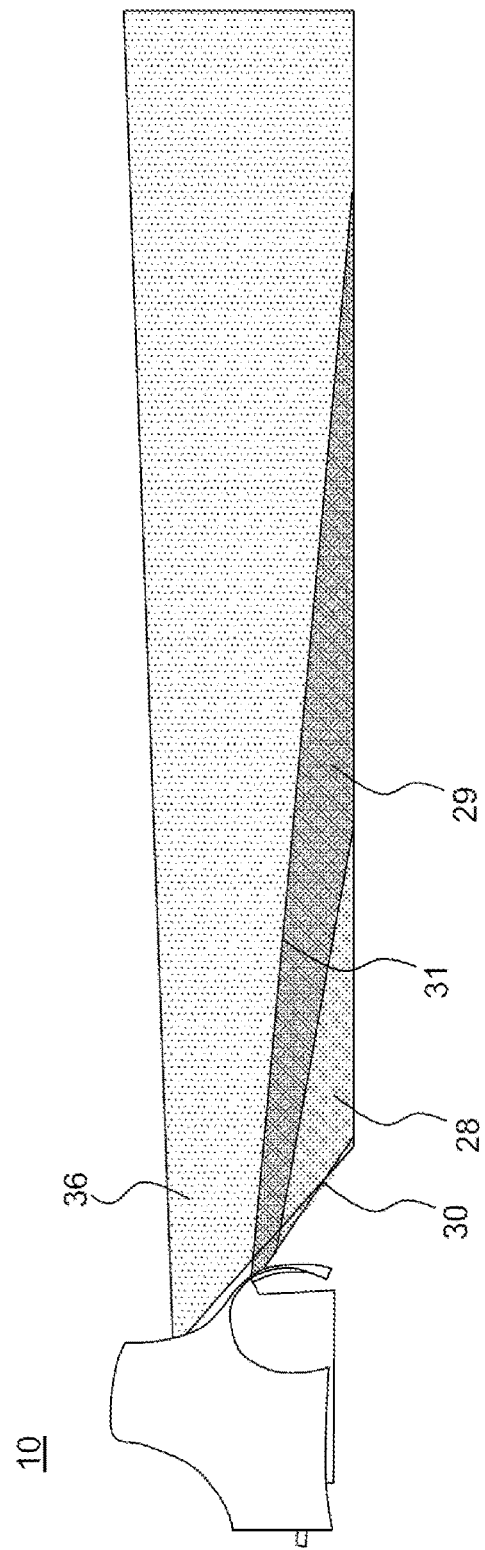

DEVICE FOR DETECTING AN OBSTACLE BY MEANS OF INTERSECTING PLANES AND DETECTION METHOD USING SUCH A DEVICE

CROSS-REFERENCE TO RELATED APPLICATIONS

This application is a National Stage of International patent application PCT/EP2015/062622, filed on Jun. 5, 2015, which claims priority to foreign French patent application No. FR 1455098, filed on Jun. 5, 2014, the disclosures of which are incorporated by reference in their entirety.

FIELD OF THE INVENTION

The invention relates to an obstacle detection device arranged on a mobile vehicle, and applies particularly to the field of navigation. The invention also relates to an obstacle detection method employing such a device.

BACKGROUND

When a mobile vehicle such as a robot moves around, it is desirable to avoid any collision between the mobile vehicle and an obstacle situated in the environment in which the mobile vehicle moves around, for example in order not to damage the mobile vehicle and/or the obstacle.

For any mobile vehicle and, therefore, also for a robot able to move, it is very important to take into account the safety of the mobile vehicle and of elements in its environment. The safety of the vehicle and of the elements in its environment in particular includes the detection of obstacles in the environment and the avoidance of collisions with these obstacles. There are various techniques for avoiding collisions. Most of these techniques involve significant implementation costs and require a significant computation power in order, for example, to determine the position of the robot in a certain frame of reference. Other existing techniques are very expensive, and therefore not suited to use in a robot.

SUMMARY OF THE INVENTION

The invention seeks to alleviate all or some of the problems mentioned hereinabove by providing a device for detecting obstacles situated in the environment of a mobile vehicle, and a method implementing such a device.

To this end, one subject of the invention is an obstacle detection device which is intended to be fitted to a mobile vehicle able to move parallel to a reference plane, characterized in that it comprises:

at least two emitters of electromagnetic beams which are able to form two virtual planes in two different directions that are able to intersect one another and intersect a potential obstacle, at least one image sensor able to produce an image of the intersection of the virtual planes and of the potential obstacle, an image analysis means able to determine the presence of an obstacle, configured to compare the image with a reference image.

According to one embodiment, the vehicle has a favored direction of travel in a first direction along an axis X and the device further comprises a first emitter referred to as an oblique emitter of a first oblique beam extending in a first oblique virtual plane in the first direction along the axis X and secant with the reference plane, and a second emitter referred to as an oblique emitter of a second oblique beam extending in a second oblique virtual plane in the first direction along the axis X and secant with the reference plane. The device also comprises a first image sensor able to produce an image around the intersection of the first and second oblique virtual planes with the reference plane.

According to one embodiment of the invention, the device comprises a first emitter referred to as a horizontal emitter of a first horizontal beam extending in a first virtual plane substantially parallel to the reference plane, and the first image sensor is able to produce an image of the intersection of the first virtual plane and of the obstacle.

According to another embodiment, the first virtual plane forms an angular sector about the axis X and the device further comprises a second emitter referred to as a horizontal emitter of a second horizontal beam extending in a second virtual plane in a first direction, forming an angular sector about an axis Y perpendicular to the axis X and substantially parallel to the reference plane. The device comprises a second image sensor able to produce an image of the intersection of the second virtual plane and of the obstacle. The device comprises a third emitter referred to as a horizontal emitter of a third horizontal beam extending in a third virtual plane in a second direction, the opposite of the first direction, forming an angular sector about the axis Y and substantially parallel to the reference plane, a third image sensor able to produce an image of the intersection of the third virtual plane and of the obstacle.

Advantageously, the angular sector formed by the first horizontal beam is spaced away from the angular sectors formed by the second and third horizontal beams by a predefined angle.

Advantageously, the angular sector is 120°.

According to another embodiment, the device further comprises positioning means for positioning a virtual plane referred to as a horizontal plane and intended to position said virtual plane referred to as a horizontal plane in such a way that it does not intersect the reference plane.

The positioning means may consist of a control loop able to determine an angular position of the virtual plane referred to as a horizontal plane with respect to the reference plane, and to transmit a new angular position to the emitter referred to as a horizontal emitter that forms the virtual plane referred to as a horizontal plane.

The positioning means may also consist of a positive angle between the virtual plane referred to as a horizontal plane and the reference plane.

According to another embodiment, the device further comprises an emitter referred to as a shovel emitter of a shovel beam extending in a virtual plane configured to intersect with the reference plane along a straight line perpendicular to the axis X and the first image sensor is able to produce an image of the straight line.

Advantageously, the beam or beams are laser beams.

Advantageously, the device comprises control means configured to selectively deactivate emitters and sensors according to the direction of travel of the vehicle.

Advantageously, the device further comprises a processing circuit configured to sequence the emissions of the beams by the emitters and to synchronize the emissions of the beams with the image captures by the sensors.

Another subject of the invention is a vehicle employing such a device.

Another subject of the invention is an obstacle detection method employing such a device, characterized in that it involves the following steps:

emission of a beam able to form a virtual plane that may intersect with the obstacle, image capture and production of an image of the intersection of the virtual plane and of the obstacle, image analysis and determination of the obstacle.

The method according to the invention may also involve the following steps:

memory storage of a first image of the intersection of the virtual plane formed by the shovel beam with the reference plane, memory storage of a second image of the intersection of the virtual plane formed by the shovel beam with the obstacle, comparison of the first and second images so as to define the location of the obstacle.

The mobile vehicle is, for example, a robot. This robot may have wheels to allow it to move around on a reference plane. The invention also applies to a humanoid robot moving around on legs.

Alternatively, the mobile vehicle may be any type of vehicle moving around parallel to a reference plane, either in contact with the reference plane via wheels, or on air cushions.

Another subject of the invention is a humanoid robot comprising a detection device according to the invention.

What is meant by a humanoid robot is a robot exhibiting similarities with a human body. This may be in terms of the upper part of the robot or only an articulated arm ending in a gripper that can be likened to a human hand. In the present invention, the upper part of the robot is similar to that of a human torso. A detection device according to the invention makes it possible to determine obstacles in the environment of the robot.

BRIEF DESCRIPTION OF THE DRAWINGS

The invention will be better understood and further advantages will become apparent from reading the detailed description of one embodiment given by way of example, which description is illustrated by the attached drawing in which:

FIG. 5 depicts virtual planes formed by beams and a field covered by an image capturing device.

DETAILED DESCRIPTION

For the sake of clarity, the same elements will bear the same references in the various figures.

In the description, the invention is described using the example of use on a robot and, more particularly, on a robot moving around on wheels. However, the invention can be applied to any mobile vehicle. A mobile vehicle 11 has a favored direction of travel in a first direction along an axis X.

Figure 1A:
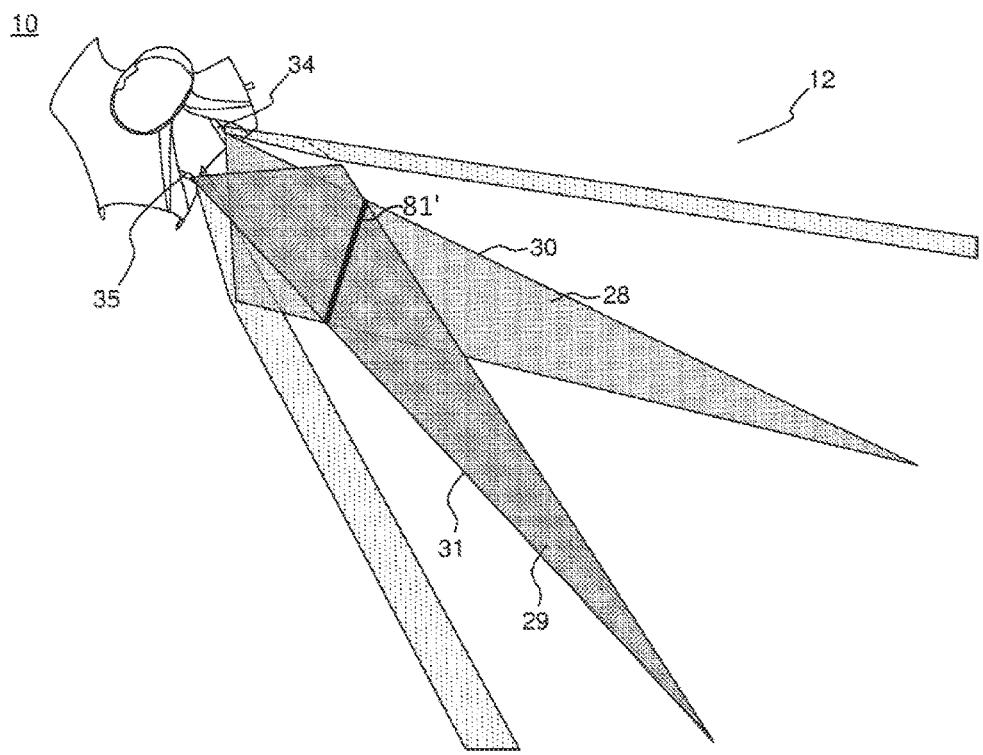
FIGS. 1A-1B depict virtual planes formed by two beams that intersect with a reference plane to form a straight line when no obstacle is encountered and to form a broken line when an obstacle is encountered.
Figure 1B:
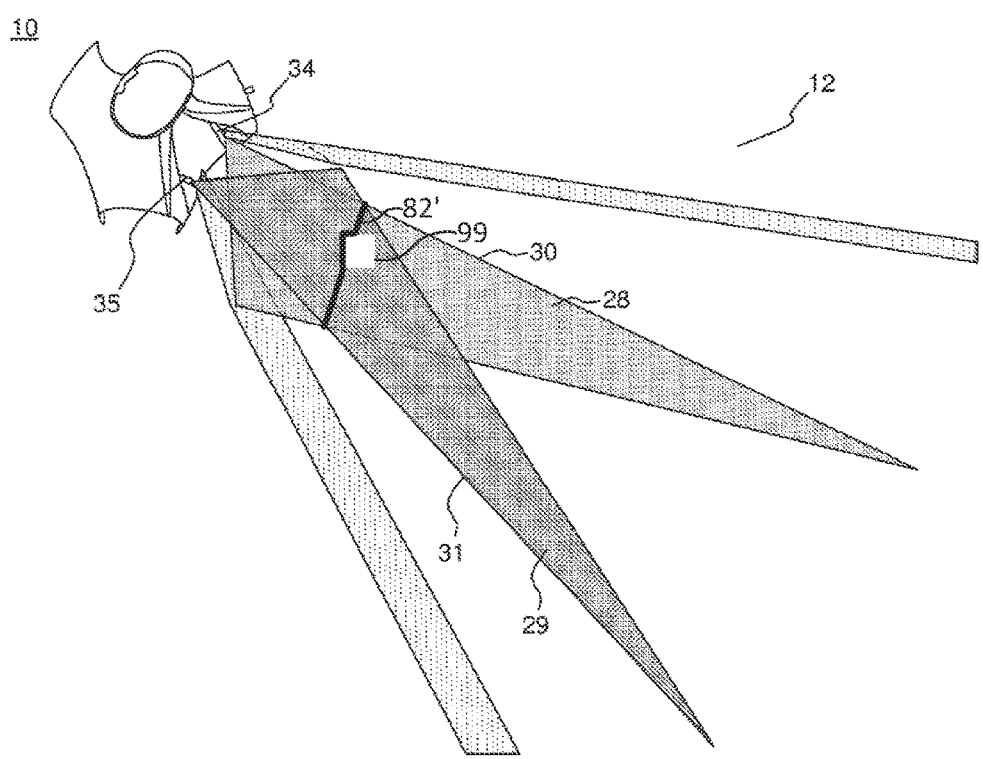

FIGS. 1A-1B depict a view of the device 10 according to the invention. The obstacle detection device 10 intended to be fitted to the mobile vehicle 11 able to move parallel to a reference plane 12 comprises at least two emitters 34, 35 of electromagnetic beams which are able to form two virtual planes in two different directions that are able to intersect a potential obstacle, at least one image sensor 5 (not depicted in either FIG. 1A or 1B) able to produce an image of the intersection of the virtual planes and of the obstacle, an image analysis means 66 (not depicted in either FIG. 1A or 1B) able to determine the obstacle, configured to compare the image with a reference image. In other words, the virtual planes formed intersect the reference plane 12 and thus form a straight line 81' when no obstacle is encountered, as depicted in FIG. 1A. In the presence of an obstacle 99, the line is therefore deformed, and it is the deformation of the line that reveals the presence of an obstacle. This deformed line is exemplarily depicted in FIG. 1B as 82'. Thus, a virtual plane is projected, the image obtained is studied, and detection of an obstacle is obtained in the form of the deformation of the line of intersection between the virtual plane and the obstacle.

FIGS. 1A-1B depict virtual planes 28, 29 formed by emitters referred to as oblique emitters 34, 35. The device 10 comprises a first emitter referred to as an oblique emitter 34 of a first oblique beam 30 extending in a first oblique virtual plane 28 in the first direction along the axis X and secant with the reference plane 12. The device 10 comprises a second emitter referred to as an oblique emitter 35 of a second oblique beam 31 extending in a second oblique virtual plane 29 in the first direction along the axis X and secant with the reference plane 12. The first image sensor 5 is able to produce an image around the intersection of the oblique virtual planes 28, 29 with the reference plane 12.

Figure 2A:
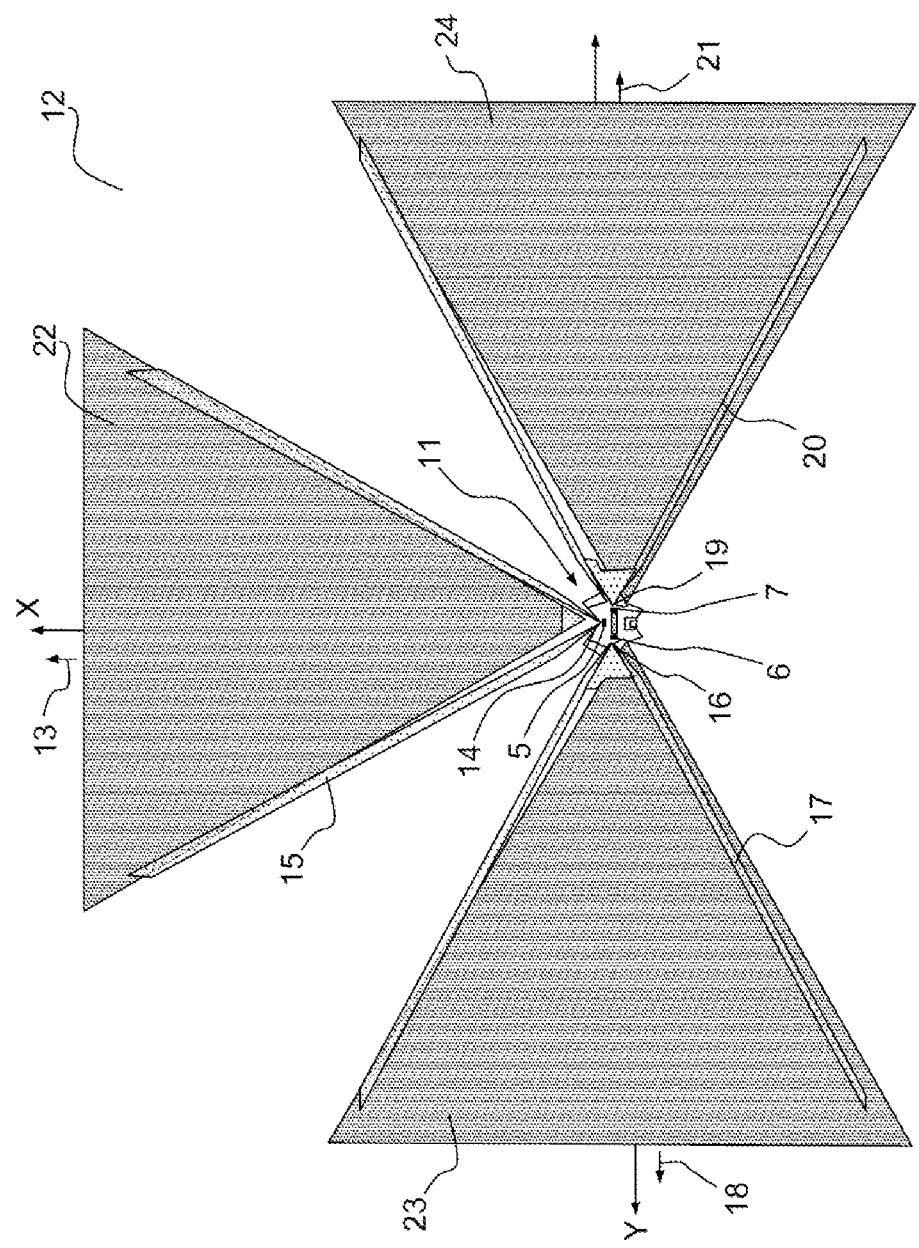
FIG. 2a depicts a plan view of a device according to the invention showing virtual planes of the beams parallel to the reference plane.

FIG. 2a is a plan view of a device according to the invention showing virtual planes of the beams which are parallel to the reference plane 12.

The device 10 comprises a first emitter referred to as a horizontal emitter 14 of a first horizontal beam 15 extending in a first virtual plane 22 substantially parallel to the reference plane 12 and the first image sensor 5 able to produce an image of the intersection of the first virtual plane 22 and of the obstacle.

Because the mobile vehicle 11 has a favored direction of travel in the first direction along the axis X, the first virtual plane 22 forms an angular sector about the axis X, and the device 10 further comprises a second emitter referred to as a horizontal emitter 16 of a second horizontal beam 17 extending in a second virtual plane 23 in a first direction, forming an angular sector about an axis Y perpendicular to the axis X and substantially parallel to the reference plane 12. The device 10 comprises a second image sensor 6 able to produce an image of the intersection of the second virtual plane 23 and of the obstacle. The device comprises a third emitter referred to as a horizontal emitter 19 of a third horizontal beam 20 extending in a third virtual plane 24 in a second direction, the opposite of the first direction, forming an angular sector about the axis Y and substantially parallel to the reference plane 12. The device 10 comprises a third image sensor 7 able to produce an image of the intersection of the third virtual plane 23 and of the obstacle.

Advantageously, the angular sector 22 formed by the first horizontal beam 15 is spaced away from the angular sectors 23, 24 formed by the second and third horizontal beams 17, 20 by a predefined angle.

The angular sector may be 60°, and the predefined angle 30°. It is also possible to have an angular sector of 90°. Advantageously, the angular sector is 120° and the predefined angle is 0°. This configuration provides full coverage of the environment surrounding the mobile vehicle 11.

Figure 2B:
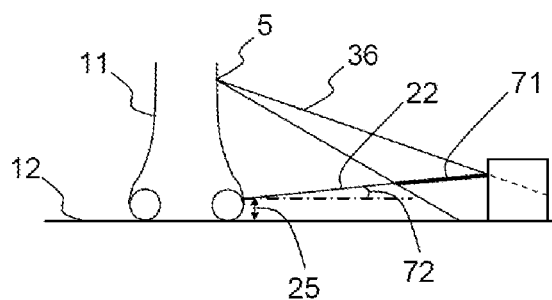
FIG. 2b depicts a view in cross section of a device according to the invention showing a virtual plane of a beam substantially parallel to the reference plane.

The first, second and third emitters referred to as horizontal emitters 14, 16, 19 are positioned on the mobile vehicle 11 at a certain height 25 from the reference plane 12 (visible in FIG. 2b). The height 25 may for example be 15 cm or 10 cm. In order to detect small obstacles, the height 25 may be 5 or 3 cm. The virtual planes 22, 23, 24 formed respectively by the emitters 14, 16, 19 may intersect with an obstacle situated at a height above the height 25 or with an obstacle part of which lies at the level of the virtual planes 22, 23 or 24. The emitters 14, 16, 19 provide obstacle detection that may be qualified as panoramic detection.

The image sensor 5 may also be an image sensor referred to as a "wide angle" sensor capable on its own of capturing images of the three virtual planes 22, 23, 24.

FIG. 2b depicts a view in cross section of a device according to the invention showing the virtual plane 22 of the beam 15 substantially parallel to the reference plane 12. It is the virtual plane 22 that will be described here, but all this is equally valid in respect of the virtual planes 23 and 24.

Advantageously, the detection device according to the invention comprises means 67 so that the virtual plane 22 is always above the reference plane 12 in a field 36 covered by the image sensor 5.

Figure 2C:
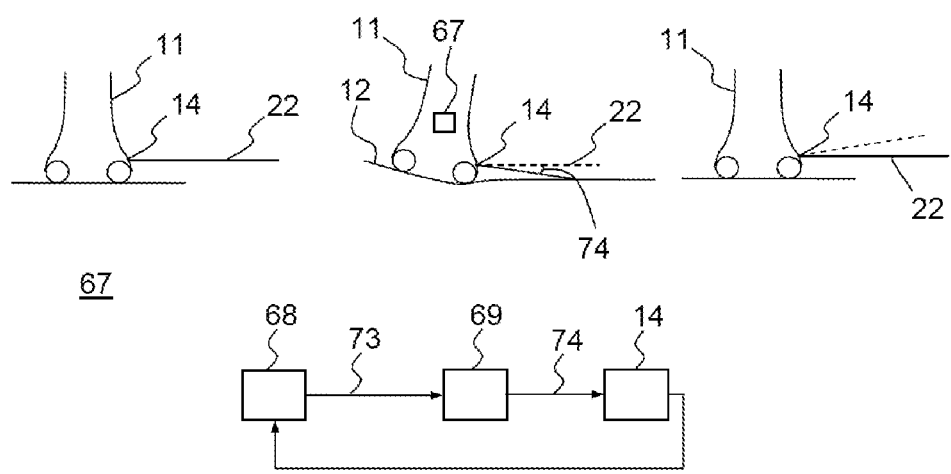
FIG. 2c depicts a control loop allowing the angular position of a virtual plane to be adjusted with respect to the reference plane.

The means 67 whereby the virtual plane 22 is always above the reference plane 12 in a field 36 may consist of a control loop that allows the emitter 14 of the beam 15 to be oriented in such a way as to orient the virtual plane 22 according to its orientation when the mobile vehicle 11 is in motion. Thus, if the mobile vehicle 11 moves over a reference plane comprising unevenesses, as depicted in FIG. 2c, the virtual plane 22 may be forced to intersect the reference plane 12. A gyroscope 68 may capture an angular position 73 of the virtual plane 22 with respect to the reference plane 12. An analysis means 69 in the control loop takes this information on board and transmits a new angular position 74 to the emitter 14 which is then oriented in such a way as to position the virtual plane 22 above the reference plane 12. When the mobile vehicle 11 is once again in motion over a completely flat surface, the analysis means 69 transmits to the emitter 14 a new angular position such that the virtual plane 22 is positioned back substantially parallel to the reference plane 12.

According to another configuration, the positioning means consist of an angle 72 between the virtual plane referred to as a horizontal plane 22 and the reference plane 12. The virtual plane 22 may therefore be oriented slightly upward. In other words, it forms the angle 72, which is a positive angle, with the reference plane 12. In this way, the virtual plane 22 never intersects the reference plane 12 even when the mobile vehicle 11 is in motion. The image sensor 5 is able to produce an image of the intersection of the virtual plane 22 and of a potential obstacle.

A detection surface 71 can thus be defined which corresponds to the intersection of the virtual plane 22 and of the cone formed by the field 36 covered by the image sensor 5. The virtual plane 22 alone may intersect with a potential obstacle having approximately a height greater than or equal to the height 25 and which may be situated at infinity. Because of the positive angle 72 and because of the field 36 of the image sensor 5, the detection surface 71 is situated close to the mobile vehicle 11. Detecting a potential obstacle therefore amounts to detecting the appearance of an image at the detection surface 71.

The oblique beams 30, 31 may intersect with small obstacles, holes, or larger-sized obstacles with which the horizontal beams 15, 17, 20 perhaps may not have been able to intersect.

Figure 3:
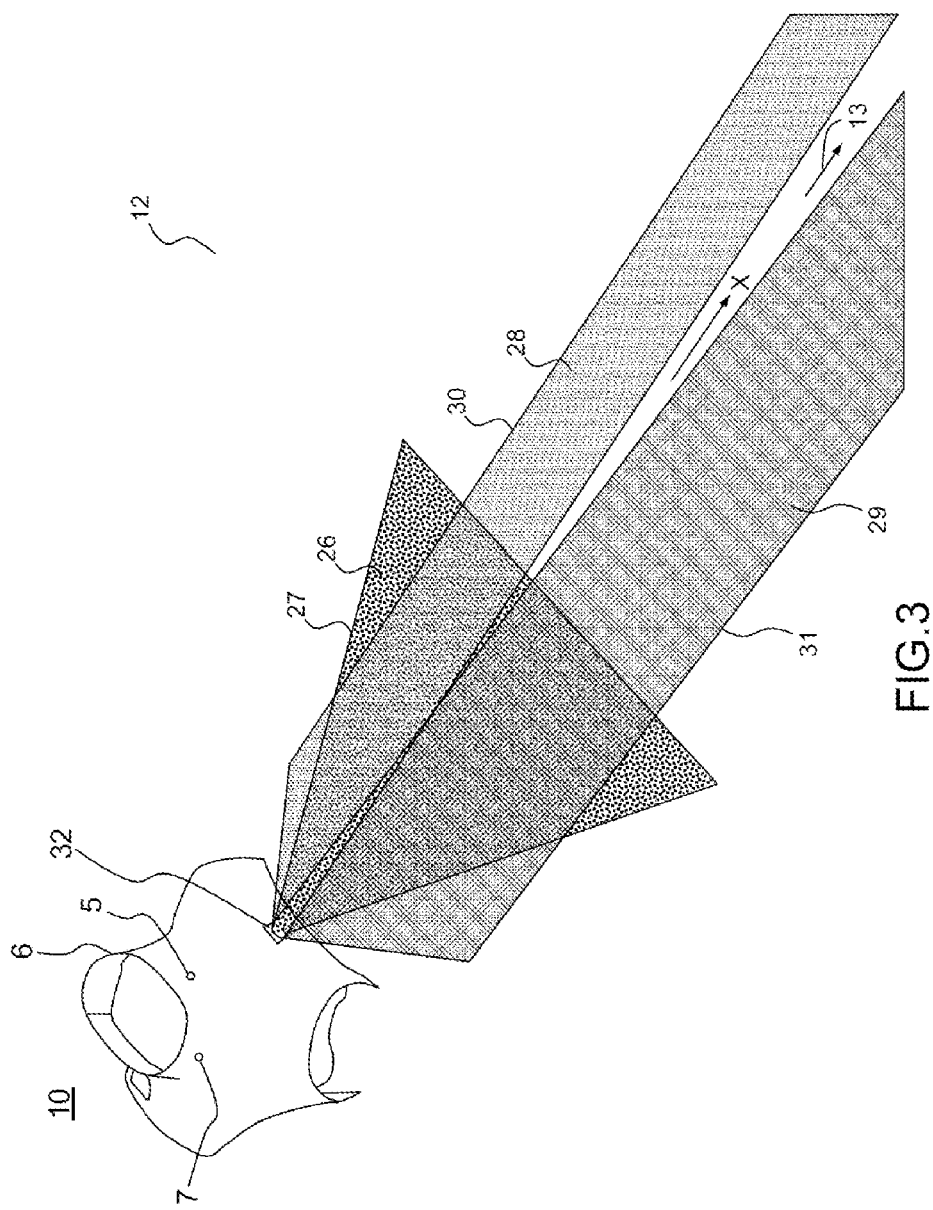
FIG. 3 depicts a virtual plane formed by a beam and virtual planes formed by two beams.

FIG. 3 depicts a virtual plane 26 formed by a shovel beam 27 emitted by an emitter referred to as a shovel emitter 32. The device 10 comprises the emitter referred to as a shovel emitter 32 of a shovel beam 27 extending in a virtual plane 26 configured to intersect with the reference plane 12 along a straight line perpendicular to the axis X. The first image sensor 5 is able to produce an image of the straight line resulting from the intersection of the virtual plane 26 and of the reference plane 12. The virtual plane 26 formed by the emitter 32 may intersect with an obstacle situated at a height corresponding to the distance 33 between the virtual plane 26 and the reference plane 12. This may be a large-sized or small-sized obstacle placed on the reference plane 12. It finds a particularly advantageous application in obstacles the height of which is less than the height 25 separating the reference plane 12 from a horizontal virtual plane. A hole or a doorstop may notably be mentioned by way of examples of obstacles.

Figure 4A:
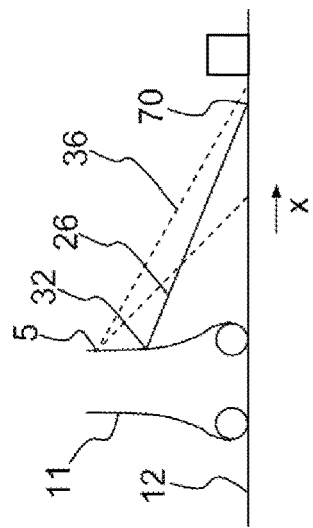
FIGS. 4a, 4b, 4c depict an intersection of a virtual plane with an obstacle according to the invention.
Figure 4B:
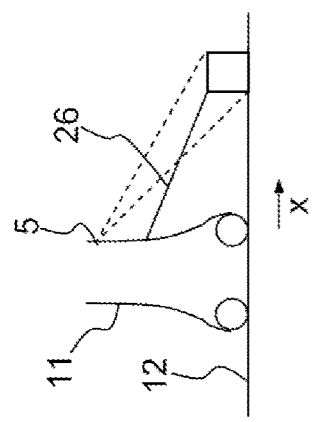
Figure 4C:
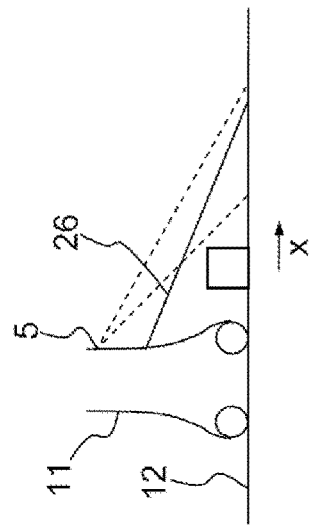

FIGS. 4a, 4b and 4c depict an intersection of the virtual plane 26 with an obstacle according to the invention. The vehicle 11 is mobile parallel to the reference plane 12. The shovel emitter 32 of the shovel beam 27 extends in the virtual plane 26. The virtual plane 26 is configured to intersect with the reference plane 12 along a straight line 70 perpendicular to the axis X, as depicted in FIG. 4a.

In other words, the virtual plane 26 formed by the shovel beam 27 allows a scan to be made of the reference plane 12. The image sensor 5 is able to produce an image of the straight line 70. An image analysis means is able to determine the presence of the obstacle, the analysis means being configured to compare the image from the sensor 5 with a reference image. It is therefore a matter of projecting a line onto the reference plane 12 in the field 36 of the image sensor 5. The instantaneous use of the virtual plane 26 makes it possible, if an obstacle is present, to detect a deformation of the line 70. Moreover, it is possible to store in memory everything that lies in the volume between the virtual plane 26 and the reference plane 12. Thus, in a use coupled with time (which means to say with the successive positions of the mobile vehicle 11) and with memory storage, the time at which an obstacle is present in the environment of the mobile vehicle 11 is known. In other words, it is possible to store in memory, at different moments in time, a first image and a second image of the intersection of the virtual plane 26 formed by the shovel beam 27 with the reference plane 12. The first and second images are then compared in order to define the location of the obstacle. The obstacle may be located in a fixed frame of reference or in a frame of reference connected with the mobile vehicle 11. This detection and location of the obstacle may be performed when the mobile vehicle is moving in the first direction along the axis X, but may also be performed in the opposite direction to the first direction (which means to say it may be performed in forward travel or in reverse travel). It is therefore possible to slow the mobile vehicle 11 and halt it before it collides with the obstacle or to cause it to divert its path. Finally, in the extreme case of the straight line 70 disappearing, that means that the mobile vehicle 11 is near a cliff edge or a step of a staircase because the image sensor 5 is then no longer able to produce an image of the line 70 which in that instance lies at a lower level than the reference plane 12. Conversely, as soon as the image sensor 5 is able to produce an image, which means to say a break in the virtual plane 26, that means either that the mobile vehicle 11 can move forward and back in the reference plane 12 without the risk of falling into a void (cliff, stairs, etc.), or that the mobile vehicle 11 is in the presence of an obstacle nearby.

It should be noted that the shovel beam can be used by itself independently of the other oblique and horizontal beams. Likewise it is entirely possible to use only the oblique beams. Finally, it is possible to use several beams together, for example a shovel beam with a horizontal beam, a shovel beam with an oblique beam, an oblique beam with a horizontal beam or any other combination of two or more beams.

Thus, the six beams 15, 17, 20, 27, 30, 31 allow the device 10 to form an intersection with virtual planes and any obstacle situated in the nearby environment.

FIG. 5 depicts a lateral view of the virtual planes 28, 29 formed by the oblique beams 30, 31 and the field 36 covered by the image sensor 5. The virtual planes 28, 29 formed respectively by the beams 30, 31 may intersect with an obstacle. The image sensor 5 may then produce an image of the intersection of the virtual plane or planes 28, 29 with the obstacle. An image analysis means (not depicted in the figure) is then able to determine the obstacle, configured to compare the image obtained with a reference image.

More specifically, the virtual planes 26, 28, 29 intersect the reference plane 12 (which in most instances corresponds to the ground over which the mobile vehicle 11 is moving) and thus form a straight line. When an obstacle is present, the line thus formed is perturbed and it is the perturbation of the line that reveals the presence of an obstacle.

It is important to note that the image sensor 5, for example a camera, is advantageously synchronized with the beam emitters allowing the beam emitters to be active only during the exposure time of the image sensor 5. It is also necessary to take account for the offset between the instant the exposure decision is taken (for example by a processor PROC arranged in the mobile vehicle 11), and the instant at which the image sensor actually captures the image.

It is also particularly advantageous to sequence all the devices that emit the beams with one another using a common pulse. This synchronization makes it possible to avoid interference between the various beams and which would carry incorrect information to the image capture and image analysis device.

Figure 9:
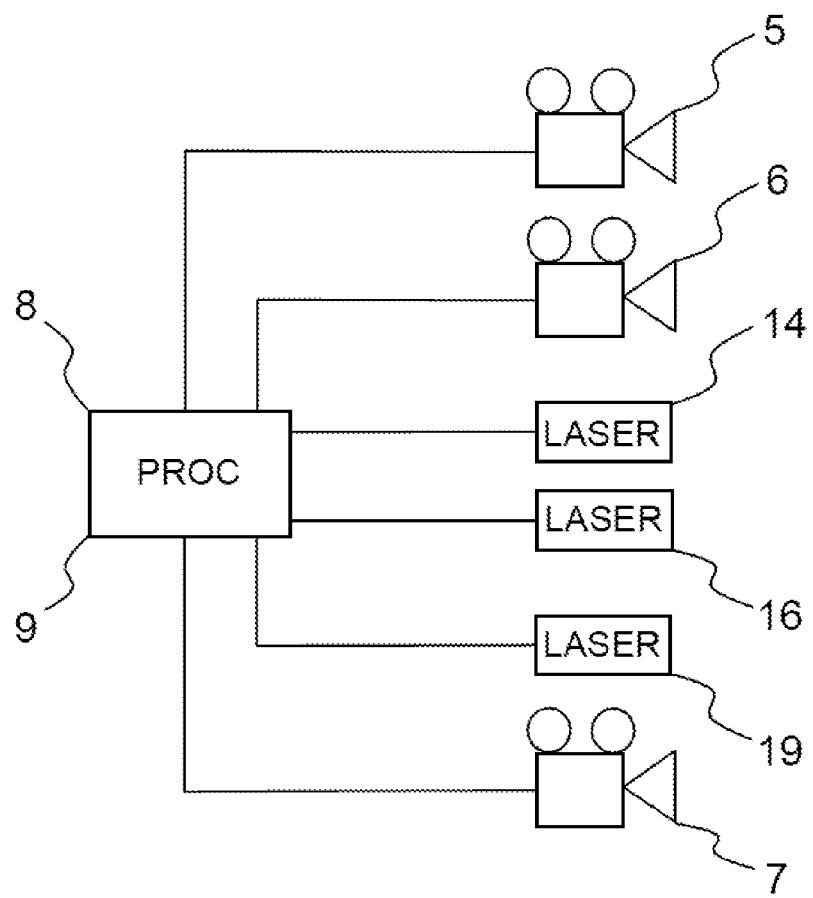

To do this, as depicted in FIG. 9, the device 10 comprises control means 8 configured to selectively deactivate emitters and sensors according to the direction of travel of the vehicle 11. That makes it possible to reduce the energy consumption of the device 10.

The device 10 further comprises a processing circuit 9 configured to sequence the emissions of the beams by the emitters and to synchronize the emissions of the beams with the image captures by the sensors. Thus, the beams are emitted one after another or simultaneously according to the configuration that the mobile vehicle 11 is in. Further, on each emission of the beam, the associated image sensor performs an image capture. For example, in order to obtain a panoramic view of the environment of the mobile vehicle 11, the three horizontal beams 15, 17, 20 are emitted simultaneously and the three image sensors 5, 6, 7 each produce an image. If a view in the favored direction of travel along the axis X is desired, the first horizontal beam may be emitted before the beam referred to as the shovel beam, and the corresponding image sensor 5 is activated in sequence, performing a first image capture at the same time as the horizontal beam is emitted, followed by a second image capture at the same time as the beam referred to as the shovel beam is emitted.

Figure 6:
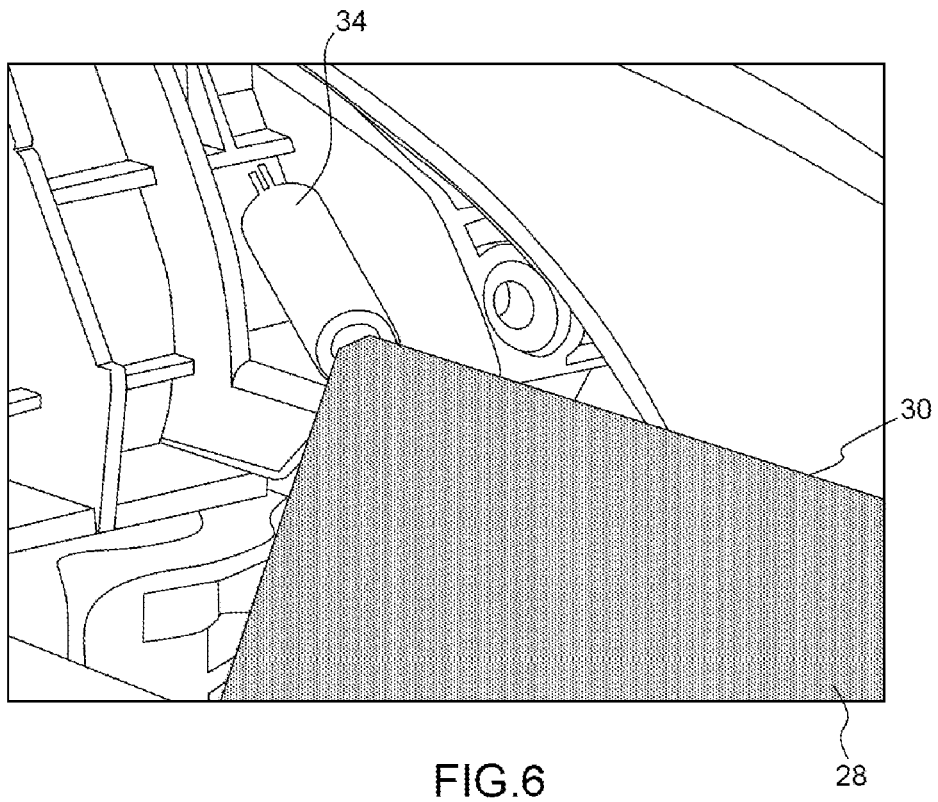
FIG. 6 depicts an emitter of a beam able to form a virtual plane.

FIG. 6 depicts the emitter 34 emitting the beam 30 able to form the virtual plane 28. Advantageously, the beam emitters are fixed on the mobile vehicle 11 so as to avoid having moving parts in and/or on the mobile vehicle 11. The fixing of the beam emitters thus offers good robustness while the mobile vehicle 11 is being transported and against vibrations of a moving part.

Advantageously, the beam or beams are laser beams.

The device 10 according to the invention may also have an exposure control means which may consist of a contrast enhancing algorithm that enhances the contrast between the light of the beam emitted and the environment. Such a control means may notably allow the device 10 to consider only a zone referred to as the safety zone in a near environment of the mobile vehicle 11. The precision with determining the obstacle is thus improved as a result.

Because a component cannot be produced with rigorously exact geometry and dimensions, and in order for the component to be able to fulfill its functions within a mechanism, tolerances (dimensional and geometric) are defined. These tolerances may have an impact on the precision of measurements. The device 10 may have a mechanism for calibrating the angle of inclination of the image sensor 5 and the angle of inclination of the emitters 14, 16, 19 of the beams 15, 17, 20. Such a calibration mechanism is generally used in a known environment and ensures good precision of measurement and therefore good precision in the determining of the obstacle.

Figure 7:
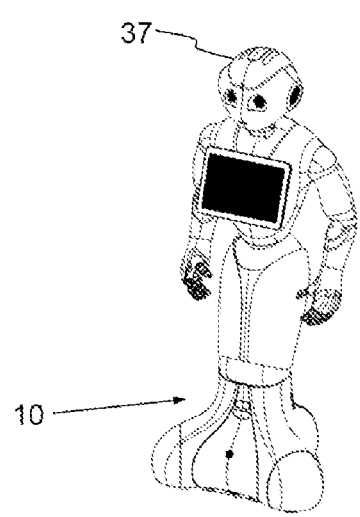
FIG. 7 depicts a humanoid robot employing an obstacle detection device according to the invention.

FIG. 7 depicts a humanoid robot 37 employing the obstacle detection device 10 according to the invention.

Figure 8:
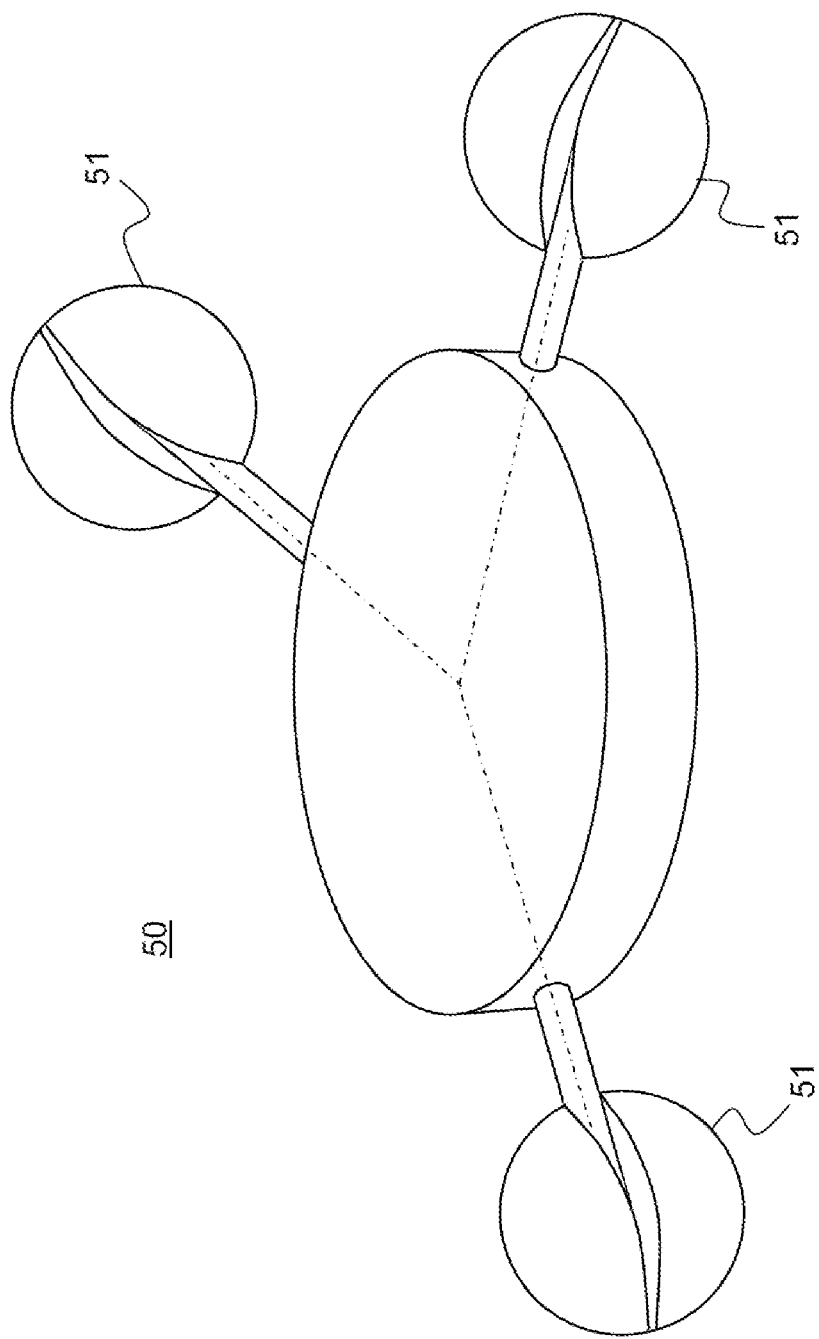
FIG. 8 depicts one example of a base comprising wheels for a humanoid robot employing an obstacle detection device according to the invention, FIG. 9 schematically depicts a processor that performs the functions of processing and synchronizing the emissions of beams and image captures, FIG. 10 schematically illustrates the steps of an obstacle detection method according to the invention.

FIG. 8 depicts one example of a base 50 comprising wheels 51 for a humanoid robot, employing the obstacle detection device according to the invention.

FIG. 9 schematically depicts a processor PROC performing the functions of processing and synchronizing the emissions of the beams and of the image captures.

Figure 10:
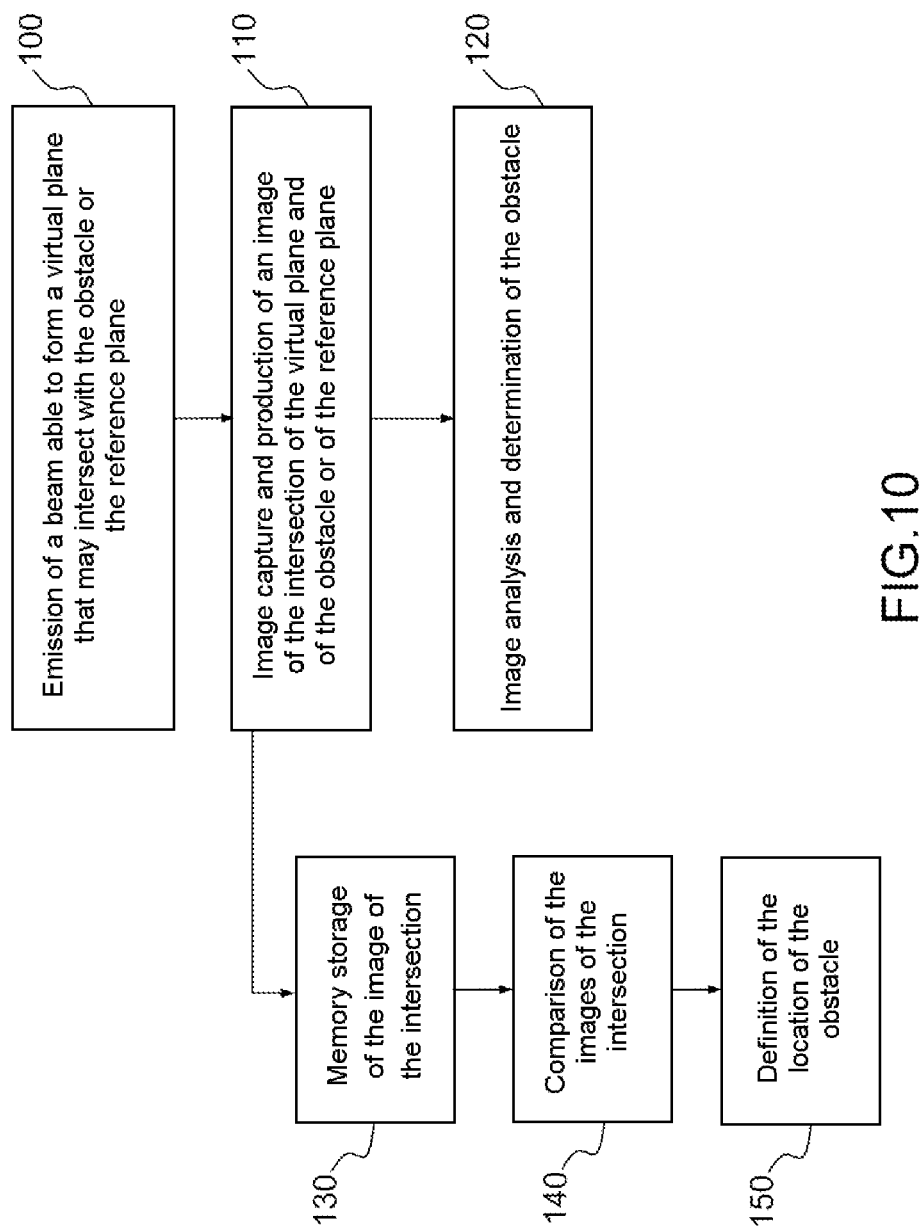

FIG. 10 schematically illustrates the steps of an obstacle detection method according to the invention. The detection method employs the detection device as described hereinabove and involves the following steps:

emission of a beam able to form a virtual plane that may intersect with the obstacle (step 100), image capture and production of an image of the intersection of the virtual plane and of the obstacle (step 110), image analysis and determination of the obstacle (step 120).

The method further involves the following steps:

memory storage of a first image of the intersection of the virtual plane (26) formed by the shovel beam (27) with the reference plane (12) (step 130), memory storage of a second image of the intersection of the virtual plane (26) formed by the shovel beam (27) with the obstacle (step 130), comparison of the first and second images (step 140) so as to define the location of the obstacle (step 150).

Figure 11A:
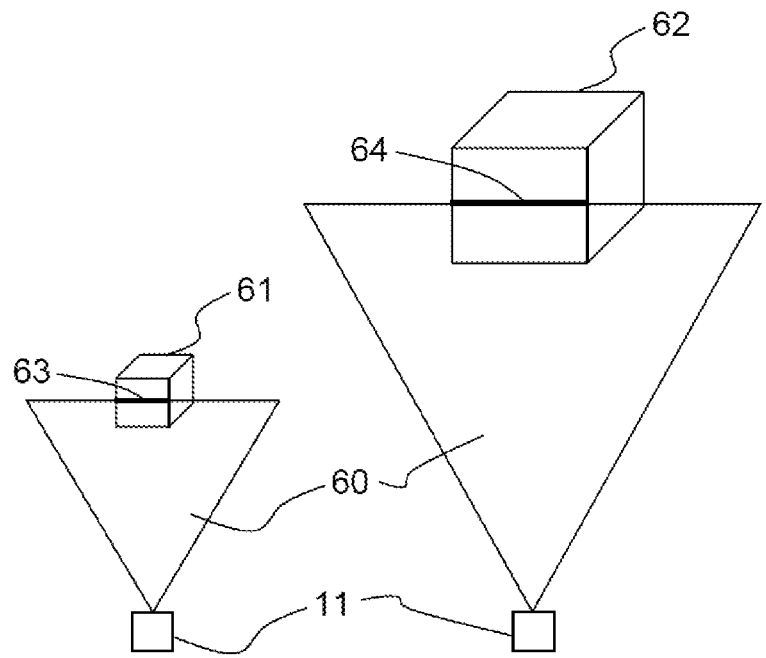
FIGS. 11a and 11b depict two obstacle detection configurations, FIG. 12 schematically illustrates a side view of a device according to the invention showing horizontal, oblique and shovel virtual planes.
Figure 11B:
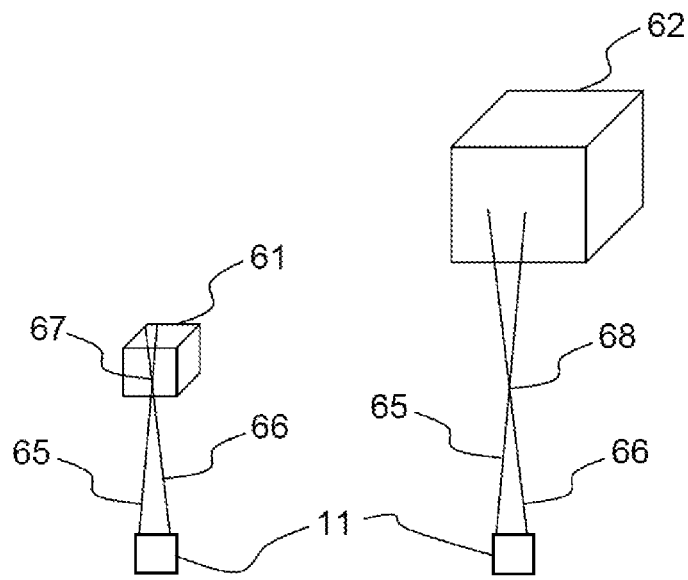

FIGS. 11*a* and 11*b* depict two obstacle detection configurations. In FIG. 11*a*, only a virtual plane 60 intersects with an obstacle. In FIG. 11*b* two virtual planes 65, 66 intersect with one another and with an obstacle with a detection device according to the invention. In both configurations, two similar obstacles 61, 62 are present (these being two cubes in the example depicted): one of them, 61, is small and close to the mobile vehicle 11 and the second one, 62, is large and further away from the mobile vehicle 11. In FIG. 11*a*, the virtual plane 60 intersects with the small cube 61. Likewise, the virtual plane 60 intersects with the large cube 62. An intersection 63 between the virtual plane 60 and the small cube 61 and an intersection 64 between the virtual plane 60 and the large cube 62 each form a line. Nevertheless, because of the difference in the size of the two cubes 61, 62 and the remote distance of the large cube 62 compared with the small cube 61 with respect to the mobile vehicle 11, the two lines of intersection 63, 64 are perceived identically by the image sensor. In FIG. 11*b*, two virtual planes 65, 66 intersect with one another and with, on the one hand, the small cube 61 close to the mobile vehicle 11 to form a line of intersection 67. The two virtual planes 65, 66 also intersect one another but not on the large cube 62 which is too far away for the intersection 68 between the two virtual planes 65, 66 to coincide with an intersection with the large cube 62. Thus, the detection of obstacles with two virtual planes in different directions and intersecting with one another allows an obstacle to be determined more precisely.

After the obstacle has been determined (step 120), it is possible for the mobile vehicle 11 to perform a further action. By way of example, mention may be made of a navigation action with a change in path or a stoppage. The device 10 according to the invention may also have a library of reference images available. These reference images correspond to predefined images that make it possible, in addition to detecting obstacles, to recognize obstacles through comparison of the image produced by the image sensor 5 with the reference images. The image analysis thus performed may notably allow the mobile vehicle 11 to recognize its recharging base and head in that direction in order to recharge its battery.

Figure 12:
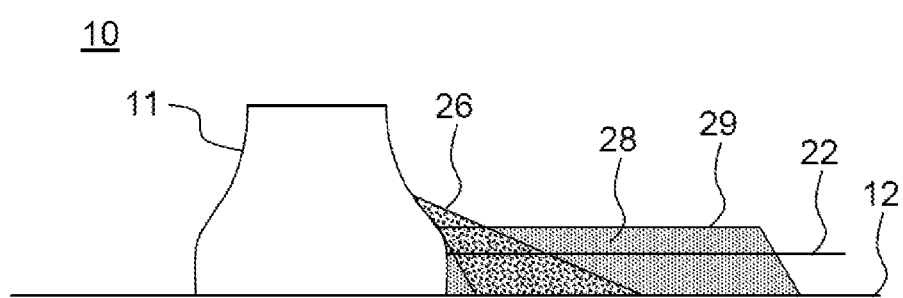

FIG. 12 schematically illustrates a side view of the device 10 according to the invention, showing the horizontal virtual planes (only the plane 22 is depicted), and the oblique 28, 29 and shovel 26 virtual planes.

FIGS. 13*a*, 13*b*, 14*a* and 14*b* depict an image obtained by intersection of a virtual plane with the reference plane with and without an obstacle. As explained previously, the virtual planes formed intersect the reference plane 12 and thus form a straight line. When an obstacle is present, the line is therefore deformed, and it is the deformation of the line that reveals the presence of an obstacle. Thus, a virtual plane is projected, the image obtained is studied and an obstacle detection is achieved through deformation of the line of intersection between the virtual plane and the obstacle.

Figure 13B:
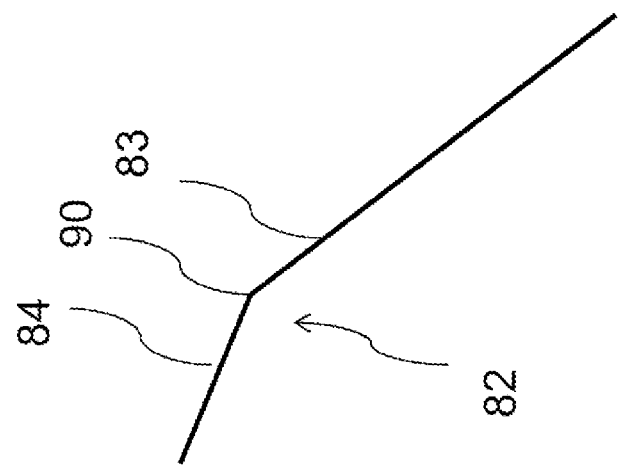
FIGS. 13a, 13b, 14a and 14b depict an image obtained by the intersection of a virtual plane with the reference plane with and without an obstacle.
Figure 13A:
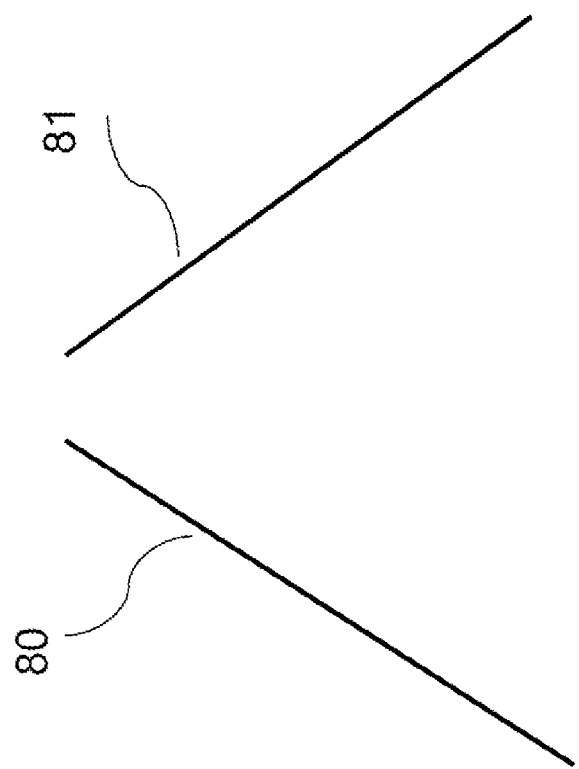

FIG. 13*a* depicts the image obtained by the intersection of the oblique virtual planes 28, 29 with the reference plane 12. There is no obstacle. The image obtained is therefore the representation of two straight lines 80 and 81. FIG. 13*b* depicts the image obtained by the intersection of the oblique virtual plane 29 with the reference plane 12 in the presence of an obstacle such as a wall. The image obtained is therefore the representation of a broken line 82, which means to say a line the continuity of which is interrupted at the projection of the virtual plane 29 onto the wall. The broken line 82 therefore comprises two parts: the part 83 which corresponds to the intersection of the virtual plane 29 with the reference plane 12 and the part 84 which corresponds to the intersection of the virtual plane 29 with the wall which forms the obstacle. Thus, deformation of the line 82 reveals the presence of the wall. The image analysis means 66 when comparing the image comprising the line 82 against the reference image comprising the line 81 is therefore able to determine the obstacle which consists of the wall. The point 90 situated at the intersection of the parts 83 and 84 of the broken line 82 thus provides the distance between the emitter and the obstacle.

Figure 14B:
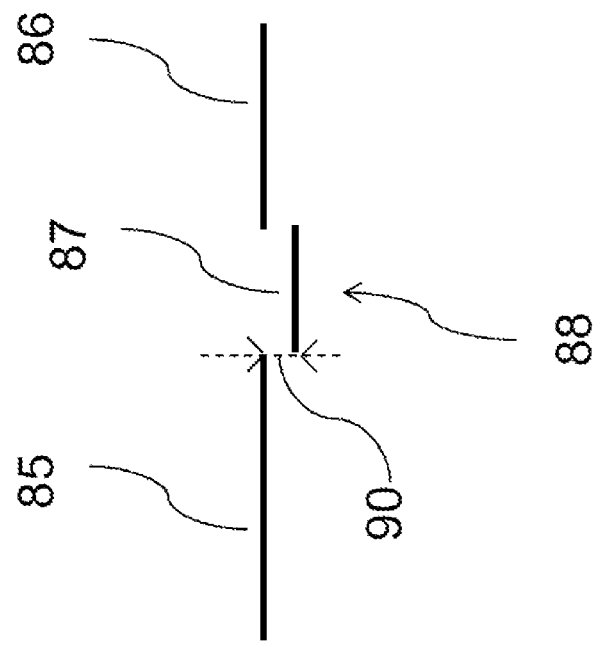
Figure 14A:
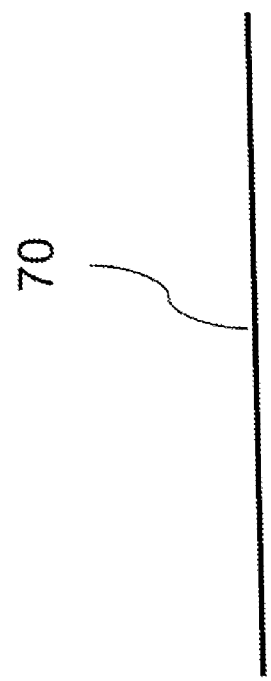

FIG. 14*a* depicts the image obtained by the intersection of the virtual plane 26 with the reference plane 12, corresponding to the configuration depicted in FIG. 4*a*. As explained previously, the virtual plane 26 is configured to intersect with the reference plane 12 along the straight line 70 perpendicular to the axis X as depicted in FIG. 4*a*. The image sensor 5 is able to produce an image of the straight line 70. Because there is no obstacle, the line 70 is a straight line.

FIG. 14*b* depicts the image obtained by intersection of the virtual plane 26 with the reference plane 12, corresponding to the configuration set out in FIG. 4*b*. This time, there is a low-height obstacle such as a doorstop. The image sensor 5 produces an image of a discontinuous straight line 88 comprising three parts: the two parts 85 and 86 that correspond to the intersection between the virtual plane 26 and the reference plane 12, and the part 87 which corresponds to the intersection of the virtual plane 26 with the obstacle. An image analysis means is able to determine the presence of the obstacle, the analysis means being configured to compare the image of the discontinuous straight line 88 with the reference image of the straight line 70. Moreover, the distance 90 between the part 87 and the part 85 (and respectively between the part 87 and the part 86) gives an indication of the distance to the obstacle, which can then be obtained by simple calculation.

What is then needed is for a line to be projected onto the reference plane 12 in the field 36 of the image sensor 5. The image sensor 5 then acquires a two-dimensional image of the intersection of virtual planes with the obstacle.

Advantageously, following the image capture and determination of the obstacle (step 110), the location of the obstacle is communicated in Cartesian coordinates in the frame of reference containing the axes X and Y. That allows the information transmitted to be compressed.

Finally, it is possible to reduce the resolution of the images captured by the image sensor in order to reduce the cost of the device 10. It is also possible to manage all the beam emitters and image sensors using one single processor, again, with a view to reducing the cost of the device 10.

The invention claimed is:

1. An obstacle detection device which is intended to be fitted to a mobile vehicle able to move parallel to a reference plane, comprising:
   at least two emitters of electromagnetic beams which are able to form two virtual planes in two different directions that are able to intersect one another and intersect a potential obstacle,
   at least one image sensor able to produce a two-dimensional (2D) image of the intersection of the two virtual planes with the potential obstacle, and
   an image analysis means able to determine the presence of an obstacle by comparing the 2D image with a reference image, wherein the obstacle is determined to be present when the 2D image comprises a deformation of a straight line, and wherein the reference image comprises a straight line formed by intersection of the two virtual planes with the reference plane.

2. The device as claimed in claim 1, wherein the vehicle has a direction of travel in a first direction along an axis X and further comprises:
   a first emitter referred to as an oblique emitter of a first oblique beam extending in a first oblique virtual plane in the first direction along the axis X and secant with the reference plane,
   a second emitter referred to as an oblique emitter of a second oblique beam extending in a second oblique virtual plane in the first direction along the axis X and secant with the reference plane,
   a first image sensor able to produce an image around the intersection of the first and second oblique virtual planes with the reference plane.

3. The device as claimed in claim 2, comprising a first emitter referred to as a horizontal emitter of a first horizontal beam extending in a first virtual plane substantially parallel to the reference plane, and wherein the first image sensor is able to produce an image of the intersection of the first virtual plane and of the obstacle.

4. The device as claimed in claim 3, wherein the first virtual plane forms an angular sector about the axis X and wherein the device further comprises:
   a second emitter referred to as a horizontal emitter of a second horizontal beam extending in a second virtual plane in a first direction, forming an angular sector about an axis Y perpendicular to the axis X and substantially parallel to the reference plane,
   a second image sensor able to produce an image of the intersection of the second virtual plane and of the obstacle,
   a third emitter referred to as a horizontal emitter of a third horizontal beam extending in a third virtual plane in a second direction, the opposite of the first direction, forming an angular sector about the axis Y and substantially parallel to the reference plane,
   a third image sensor able to produce an image of the intersection of the third virtual plane and of the obstacle.

5. The device as claimed in claim 4, wherein the angular sector formed by the first horizontal beam is spaced away from the angular sectors formed by the second and third horizontal beams by a predefined angle.

6. The device as claimed in claim 5, wherein the angular sector is 120°.

7. The device as claimed in claim 3, further comprising positioning means for positioning a virtual plane referred to as a horizontal plane and intended to position said virtual plane referred to as a horizontal plane in such a way that it does not intersect the reference plane.

8. The device as claimed in claim 7, wherein the positioning means consist of a control loop able to determine an angular position of the virtual plane referred to as a horizontal plane with respect to the reference plane, and to transmit a new angular position to the emitter referred to as a horizontal emitter that forms the virtual plane referred to as a horizontal plane.

9. The device as claimed in claim 7, wherein the positioning means consist of an orientation of the emitter of the beam in such a way as to orient the virtual plane referred to as a horizontal plane in such a way as to form a positive angle between the virtual plane referred to as a horizontal plane and the reference plane.

10. The device as claimed in claim 2, further comprising:
    an emitter referred to as a shovel emitter of a shovel beam extending in a virtual plane configured to intersect with the reference plane along a straight line perpendicular to the axis X,
    wherein the first image sensor is able to produce an image of the straight line perpendicular to the axis X, and wherein the image analysis means is able to determine the presence of an obstacle by detecting a deformation of the straight line perpendicular to the axis X.

11. The device as claimed in claim 2, comprising control means configured to selectively deactivate emitters and sensors according to the direction of travel of the vehicle.

12. The device as claimed in claim 2, wherein it further comprises a processing circuit configured to sequence the emissions of the beams by the emitters and to synchronize the emissions of the beams with the image captures by the sensors.

13. The device as claimed in claim 1, wherein the beam or beams are laser beams.

14. A vehicle, comprising an obstacle detection device as claimed in claim 1.

15. An obstacle detection method employing a device as claimed in claim 1, comprising the following steps:
    emission of a beam able to form a virtual plane that may intersect with the obstacle,
    image capture and production of an image of the intersection of the virtual plane and of the obstacle,
    image analysis and determination of the obstacle.

16. The detection method as claimed in claim 15, further comprising the following steps:
    memory storage of a first image of the intersection of the virtual plane formed by the shovel beam with the reference plane,
    memory storage of a second image of the intersection of the virtual plane formed by the shovel beam with the obstacle,
    comparison of the first and second images so as to define the location of the obstacle.

* * * * *